US005544684A

United States Patent [19]

Robinette, III

[11] Patent Number: 5,544,684

[45] Date of Patent: Aug. 13, 1996

[54] MULTIPLE SOLUTE STANDARD PREPARATION

[75] Inventor: Rex T. Robinette, III, Midland, Mich.

[73] Assignee: The Dow Chemical Company, Midland, Mich.

[21] Appl. No.: 352,332

[22] Filed: Dec. 8, 1994

[51] Int. Cl.[6] ................................ B65B 1/30; B65B 3/26

[52] U.S. Cl. ............................ 141/83; 141/100; 141/104; 177/25.14; 364/567

[58] Field of Search ................................ 141/9, 83, 100, 141/104, 105; 177/25.14, 50, 116; 364/567, 579, 571.05, 479, 502; 137/98, 101.21, 101.31

[56] References Cited

U.S. PATENT DOCUMENTS

| | | | |
|---|---|---|---|
| 5,156,194 | 10/1992 | von Nehring et al. | 141/1 |
| 5,287,896 | 2/1994 | Graffin | 141/83 |
| 5,375,634 | 12/1994 | Egger | 141/83 |
| 5,402,834 | 4/1995 | Levin et al. | 141/100 |

OTHER PUBLICATIONS

*Design Scientific,* "AcuPrep Automatic Solution Preparation" Brochure (no available date).

Skelly, N. E., et al. "Isomer-Specific Assay of Ester and Salt Formulations of 2,4-Dichlorophenoxyacetic Acid by Automated High Pressure Liquid Chromatography". *Journal of the Association of Official Analytical Chemists,* vol. 60, Jul. 1977, pp. 868–872.

*Primary Examiner*—Henry J. Recla
*Assistant Examiner*—Steven O. Douglas
*Attorney, Agent, or Firm*—Timothy S. Stevens

[57] ABSTRACT

A method for the automated preparation of a standard solution containing at least two solutes wherein the user of the method adds the solutes to a container according to the respective target weights of the solutes. The ratio between the actual weight of the first solute added and the target weight of the first solute is used to update the target weight of the second solute so that the concentration of the second solute in the standard is closer to its desired concentration.

6 Claims, 1 Drawing Sheet

10 23 18 13 19 17 14 22 15 12 21 20 11 16 25 26 24

MULTIPLE SOLUTE STANDARD PREPARATION

Chemical analysis methods, such as the assay of a herbicide formulation by High Performance Liquid Chromatography, need to be calibrated using a standard solution. A standard solution is typically prepared by a skilled person by carefully weighing a predetermined amount of a solute into a volumetric flask and then adding a solvent to the mark on the flask. Alternatively, the solvent can be weighed to prepare a standard on a weight/weight basis. The solvent may or may not contain an internal standard. If the standard solution contains two or more solutes, then each solute is carefully weighed by the skilled person. The above method of preparing a standard solution is labor intensive and requires a skilled person. Therefore, the art has developed automated methods that are less labor intensive and require less skill.

U.S. Pat. No. 5,156,194 to von Nehring and Beyer disclosed an automated method for preparing a standard solution wherein a solute is added to a container not to a predetermined weight but rather to a relatively broad weight range, the center of which range is the target weight. The system then accurately weighs the solute and adds an automatically adjusted amount of solvent.

The Design Scientific Corporation of Gainesville, Ga. sells the AcuPrep System for automatic solution preparation. A solute is added to a container not to a specific predetermined weight but rather to a relatively broad weight range, the center of which range is the target weight. The system then accurately weighs the solute and adds an automatically adjusted amount of solvent.

A problem with the method of the '194 patent and the AcuPrep System arises when the standard is to contain multiple solutes. For Example, if the actual weight of the first solute is low in its weight range while the actual weight of the second solute is high in its weight range, then the concentration of the second solute in the standard can be substantially higher than desired even though the concentration of the first solute is almost exactly correct. Similarly, if the actual weight of the first solute is high in its weight range while the actual weight of the second solute is low in its weight range, then the concentration of the second solute in the standard can be substantially lower than desired even though the concentration of the first solute is almost exactly correct.

SUMMARY OF THE INVENTION

The primary benefit of the instant invention is a solution to the problem discussed in the preceding paragraph. In the instant invention the target weight of the second solute is updated depending on the actual weight of the first solute.

The instant invention is a method for the preparation of a standard solution containing at least a first solute and a second solute dissolved in a solvent, the solution containing an essentially desired concentration of the first solute and a substantially desired concentration of the second solute. The instant invention includes eleven steps. The first step is to weigh a container to determine the tare weight of the container. The second step is to assign a target weight for the solvent. The third step is to assign a target weight for the first solute. The fourth step is to assign a target weight for the second solute. The fifth step is to add the first solute to the container. The sixth step is to weigh the container to determine the weight of the first solute added to the container. The seventh step is to determine the ratio of the weight of the first solute added to the container to the target weight for the first solute. The eighth step is to multiply the target weight for the second solute by the ratio of the seventh step to obtain an updated target weight for the second solute. The ninth step is to add the second solute to the container. The tenth step is to weigh the container to determine the weight of the second solute added to the container. The eleventh step is to add a weight of the solvent to the container, the weight of the solvent being essentially equal to the quantity of the weight of the sixth step divided by the weight of the third step which quantity is then multiplied by the weight of the second step.

DETAILED DESCRIPTION OF THE INVENTION

Figure 1:
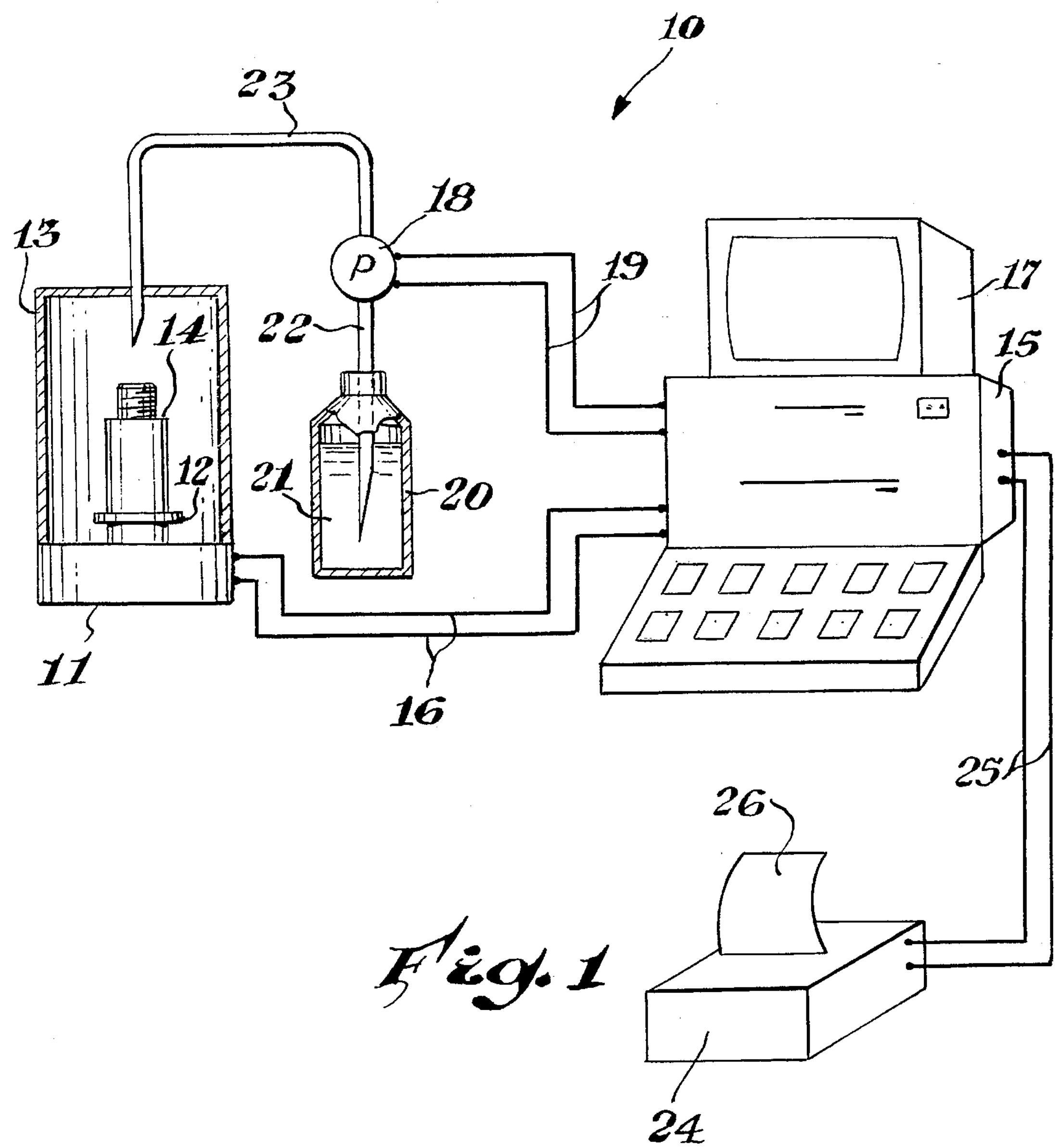
FIG. 1 is a drawing of an apparatus for carrying out the method of the instant invention.

The instant invention is a method for the preparation of a standard solution containing at least a first solute and a second solute dissolved in a solvent which may or may not contain an internal standard, the solution containing essentially the desired concentration of the first solute and a concentration of the second solute which is substantially the desired concentration.

For example, the preparation of a standard solution having p-bromophenol as the internal standard, picloram as the first solute and 2,4-D as the second solute in a solvent of propanol/water containing potassium hydroxide according to the method outlined by Skelly et al. in the Journal of the Association of Official Analytical Chemists, 868 (1977).

The instant invention includes eleven steps. The first step is to weigh a container, such as a screw cap bottle, to determine the tare weight of the container. The second step is to assign a target weight for the solvent. In the above method of Skelly et al. the target weight for the solvent would be prescribed as twenty five grams. In general, the target weight for the solvent is prescribed by the specific method being followed. The third step is to assign a target weight for the first solute. In the above method of Skelly et al. the target weight of the first solute (picloram) would be about one hundred milligrams. In general, the target weight for the first solute is, again, prescribed by the specific method being followed. The fourth step is to assign a target weight for the second solute. In the above method of Skelly et al. the target weight of the second solute (2,4-D) would be about three hundred milligrams. In general, the target weight for the second solute is, again, prescribed by the specific method being followed.

The fifth step is to add the first solute to the container. In the above method of Skelly et al. about one hundred milligrams of picloram would be added to the container. It is not at all important that exactly one hundred milligrams be added, a scoop can be used that is known to contain about one hundred milligrams. The sixth step is to weigh the container to determine the weight of the first solute added to the container. The seventh step is to determine the ratio of the weight of the first solute added to the container to the target weight for the first solute. For example, if the target weight of the first solute is one hundred milligrams and actual weight of the first solute is one hundred and ten milligrams, then the ratio is one and one tenth.

The eighth step is to multiply the target weight for the second solute by the ratio of the seventh step to obtain an updated target weight for the second solute. For example, if the target weight for the second solute is three hundred milligrams and the ratio is one and one tenth, then the updated target weight for the second solute is three hundred and thirty milligrams. The ninth step is to add the second solute to the container. The tenth step is to weigh the container to determine the weight of the second solute added to the container.

Ideally, the amount of second solute added to the container is exactly the updated target weight so that the concentration of both the first and second solute are essentially as desired. However, the practical reality is that if the addition of the second solute is labor intensive of skilled persons, then the advantage of this invention is reduced. Thus, the amount of second solute added to the container is preferably an approximate amount in the range of from 0.75 to 1.25 of the updated target weight for the second solute. More preferably, the amount of second solute added to the container is an approximate amount in the range of from 0.9 to 1.1 of the updated target weight for the second solute. However, again, if the range is so narrow that the addition of the second solute is as labor intensive of skilled persons as the prior art, then the advantage of this invention is reduced.

The eleventh step is to add a weight of the solvent to the container, the weight of the solvent being essentially equal to the quantity of the weight of the sixth step divided by the weight of the third step which quantity is then multiplied by the weight of the second step. Continuing with the above example of the method of Skelly et al., this would work out to the quantity of one hundred and ten divided by one hundred, this quantity times twenty five grams. Thus, the weight of solvent added to the container should be essentially equal to twenty seven and one half grams, the closer to this value the better. If the weight of solvent added to the container is essentially equal to twenty seven and one half grams, then the concentration of the first solute (picloram) is essentially the desired one of one hundred milligrams of picloram per twenty five grams of solvent.

The concentration of the second solute in the solution can then be determined by dividing the weight of the tenth step by the weight of the eleventh step. Thus, continuing with the example of the method of Skelly et al. above, if the weight of the second solute (2,4-D) was three hundred and fifty two milligrams, then the concentration of 2,4-D would be three hundred and twenty milligrams per twenty five grams of solvent. It will be noticed that the desired concentration of 2,4-D was three hundred milligrams per twenty five grams of solvent and not the actual three hundred and twenty milligrams per twenty five grams of solvent that resulted in this example. Thus, this method gives a concentration of the second solute which is substantially that which was desired (a substantially desired concentration) and not necessarily essentially the desired concentration (an essentially desired concentration). However, it will be noted that this method does result in the achievement of the essentially desired concentration of the first solute.

The preferred means to carry out the instant invention is to modify the commercially available AcuPrep system from Design Scientific of Gainesville, Ga. This modified system 10 is shown in FIG. 1 which includes an electronic balance 11. The electronic balance 11 has a weighing pan 12 and a cabinet 13. A bottle 14 is shown in the cabinet 13 and upon the pan 12. The electronic balance 11 is connected to an IBM brand computer 15 model PC-AT by wires 16. The computer 15 has a monitor 17. A gear pump 18 is connected to the computer 15 by wires 19. A solvent reservoir 20 contains a solvent 21. The pump 18 pumps the solvent 21 into the bottle 14 by way of a suction tube 22 and a discharge tube 23. A label printer 24 is connected to the computer 15 by way of wires 25.

The program in the computer 15 is modified with the following additional program lines: SmplWt1!=Smp1Wt1!*purity1/100; SmplWt2!=SmplWt2!*Purity2/100*TargetWt1!/(SmplWt1!); SmplWt3!=SmplWt3!*Purity3/100*TargetWt1/(SmplWt1!). The modified program is designated by Design Scientific under the "HerbPrep" name.

The modified system 10 is started and the user follows the menu as shown on the monitor 17. The user adds the first and second solutes to the bottle 14 according to this menu. The computer, via the pump 18, adds the solvent 21 to the bottle 14. The computer, via the label printer 24, also prints a label 26 to be applied to the bottle 14.

Although the modified system 10 is preferred, it should be understood that the instant invention is a method which can even be operated manually or by any number of suitable automated apparatus systems.

What is claimed is:

1. A method for the preparation of a standard solution containing at least a first solute and a second solute dissolved in a solvent, the solution containing an essentially desired concentration of the first solute and a substantially desired concentration of the second solute, comprising the steps of:

(a) weigh a container to determine the tare weight of the container;

(b) assign a target weight for the solvent;

(c) assign a target weight for the first solute;

(d) assign a target weight for the second solute;

(e) add the first solute to the container;

(f) weigh the container to determine the weight of the first solute added to the container;

(g) determine the ratio of the weight of the first solute added to the container to the target weight for the first solute;

(h) multiply the target weight for the second solute by the ratio of step (g) to obtain an updated target weight for the second solute;

(i) add the second solute to the container;

(j) weigh the container to determine the weight of the second solute added to the container; and (k) add a weight of the solvent to the container, the weight of the solvent being essentially equal to the quantity of the weight of step (f) divided by the weight of step (c) which quantity is then multiplied by the weight of step (b).

2. The method of claim 1, wherein the weight of step (j) is in the range of from 0.75 to 1.25 of the weight of steep (h).

3. The method of claim 1, wherein the weight of step (j) is in the range of from 0.9 to 1.1 of the weight of step (h).

4. The method of claim 1 wherein the solvent contains an internal standard.

5. The method of claim 2 wherein the solvent contains an internal standard.

6. The method of claim 3 wherein the solvent contains an internal standard.

* * * * *